(12) United States Patent
Feng et al.

(10) Patent No.: US 10,712,247 B2
(45) Date of Patent: Jul. 14, 2020

(54) OPGW SINGLE WIRE TORSIONAL FATIGUE TEST METHOD, APPARATUS AND STORAGE MEDIUM

(71) Applicants: CHINA ELECTRIC POWER RESEARCH INSTITUTE COMPANY LIMITED, Beijing (CN); STATE GRID CORPORATION OF CHINA, Beijing (CN); STATE GRID ZHEJIANG ELECTRIC POWER COMPANY, Hangzhou (CN)

(72) Inventors: Xuebin Feng, Beijing (CN); Jiyong Hou, Beijing (CN); Xichun Ren, Beijing (CN); Yueguo Chen, Beijing (CN)

(73) Assignees: CHINA ELECTRIC POWER RESEARCH INSTITUTE CO. LTD., Beijing (CN); STATE GRID CORPORATION OF CHINA, Beijing (CN); STATE GRID ZHEJIANG ELECTRIC POWER COMPANY, Hangzhou (CN)

(*) Notice: Subject to any disclaimer, the term of this patent is extended or adjusted under 35 U.S.C. 154(b) by 113 days.

(21) Appl. No.: 15/781,275

(22) PCT Filed: Jul. 21, 2017

(86) PCT No.: PCT/CN2017/093852
§ 371 (c)(1),
(2) Date: Jun. 4, 2018

(87) PCT Pub. No.: WO2018/045833
PCT Pub. Date: Mar. 15, 2018

(65) Prior Publication Data
US 2018/0356324 A1    Dec. 13, 2018

(30) Foreign Application Priority Data
Sep. 9, 2016    (CN) .......................... 2016 1 0816243

(51) Int. Cl.
| G01N 3/38 | (2006.01) |
| G01N 3/02 | (2006.01) |
| G01N 3/08 | (2006.01) |
| G01M 1/00 | (2006.01) |
| G01M 11/08 | (2006.01) |

(52) U.S. Cl.
CPC ................ *G01N 3/38* (2013.01); *G01M 1/00* (2013.01); *G01M 11/088* (2013.01); *G01N 3/02* (2013.01);
(Continued)

(58) Field of Classification Search
CPC .. G01N 3/38; G01N 3/02; G01N 3/08; G01M 11/088; G01M 1/00
See application file for complete search history.

(56) References Cited

U.S. PATENT DOCUMENTS 2,844,958 A    7/1958    Bennett
4,636,070 A *  1/1987    Ide ........................ G01M 11/088
                                                         356/73.1
(Continued)

FOREIGN PATENT DOCUMENTS

CN    101699260 A    4/2010
CN    101858945 A    10/2010
(Continued)

OTHER PUBLICATIONS

Translation of CN105067434.*
(Continued)

*Primary Examiner* — Helen C Kwok
(74) *Attorney, Agent, or Firm* — Syncoda LLC; Feng Ma

(57) ABSTRACT

Describe are an OPGW single wire torsional fatigue test method, apparatus and storage medium. The method
(Continued)

includes: a preset torsional angle and preset cycle number of torsions of an OPGW single wire are acquired (S1); forward and backward torsional forces are sequentially and alternately applied to the OPGW single wire according to the preset torsional angle (S2); when a number of application times of the applied torsional forces reaches a preset cycle number of torsions, torsional force application to the OPGW single wire is stopped (S3). According to the test method, a bidirectional torsional fatigue test on the OPGW single wire may be made by sequentially and alternately applying the forward and backward torsional forces to the OPGW single wire, so that reliability of a test result and test efficiency are improved. In addition, a torsional force loading device is controlled by a control device of the test apparatus in the disclosure to make the bidirectional torsional fatigue test on the OPGW single wire, meanwhile, a unidirectional torsion test and a tensile test may further be made on it, and the apparatus is easy to operate and diversified in function.

13 Claims, 2 Drawing Sheets

(52) U.S. Cl.
CPC ....... *G01N 3/08* (2013.01); *G01N 2203/0017* (2013.01); *G01N 2203/0021* (2013.01); *G01N 2203/0073* (2013.01)

(56) References Cited

U.S. PATENT DOCUMENTS

| | | | | |
|---|---|---|---|---|
| 4,997,258 | A * | 3/1991 | Oestreich | G02B 6/4491 264/1.28 |
| 5,189,897 | A * | 3/1993 | Lionetti | B21C 1/06 72/278 |
| 6,493,486 | B1 * | 12/2002 | Chen | G02B 6/0218 385/37 |
| 2006/0285850 | A1 * | 12/2006 | Colpitts | G01B 11/16 398/108 |
| 2012/0182130 | A1 * | 7/2012 | Sarchi | G01L 5/047 340/10.1 |
| 2015/0040681 | A1 * | 2/2015 | Sarchi | G01M 5/0025 73/847 |
| 2016/0061748 | A1 * | 3/2016 | Handler | G01N 21/255 356/402 |
| 2016/0099090 | A1 * | 4/2016 | Huang | H01B 1/023 174/102 A |
| 2019/0101481 | A1 * | 4/2019 | Dingmann | G01N 3/08 |

FOREIGN PATENT DOCUMENTS

| | | |
|---|---|---|
| CN | 204008275 U | 12/2014 |
| CN | 105067434 A | 11/2015 |
| CN | 105181499 A | 12/2015 |
| CN | 105891028 A | 8/2016 |
| CN | 106404556 A | 2/2017 |
| CN | 106501108 A | 3/2017 |
| JP | 62-212548 * | 9/1987 |
| JP | H07159303 A | 6/1995 |

OTHER PUBLICATIONS

Translation of CN105181499.*
Translation of JP62-212548.*
International Search Report in international application No. PCT/CN2017/093852, dated Oct. 24, 2017.
"The development of mechanical properties automatic test system for electric power optical fiber cable," dated Jun. 15, 2006.

* cited by examiner

OPGW SINGLE WIRE TORSIONAL FATIGUE TEST METHOD, APPARATUS AND STORAGE MEDIUM

CROSS-REFERENCE TO RELATED APPLICATIONS

This application is based upon and claims priority to Chinese Patent Application No. 201610816243.1, filed on Sep. 9, 2016, the entire contents of which are incorporated herein by reference.

TECHNICAL FIELD

The disclosure relates to the technical field of wire performance testing, and more particularly, to an optical fiber composite overhead ground wire (OPGW) single wire torsional fatigue test method, apparatus, and storage medium.

BACKGROUND

At present, an OPGW is widely applied in a power system by virtue of its advanced manufacturing technology and higher operational reliability. The OPGW is erected on the same tower with a transmission line, and is positioned at the top of an overhead wire. The OPGW may prevent a lightning and bear a short-circuit current, and is also responsible for transmitting power information. In recent years, since more and more serious natural disasters, severe weather and external damages frequently appear, a rate of occurrence of serious failures of a power grid is increased, chain reactions are easily triggered, and there always exist large-area power outage risks. It is necessary to improve and enhance operation safety and reliability of the OPGW, and particularly, a problem about evaluation of service life of the OPGW which is iced and corroded becomes particularly important. Wherein, torsion resistance of the OPGW is an important performance parameter.

The OPGW mainly consists of an optical unit, a metallic single wire and factice, wherein torsion resistance of the metallic single wire determines a torsion resisting effect of the OPGW. Therefore, a torsional performance test on an OPGW single wire is necessary means for an optical cable product quality supervision and inspection organization and even an optical fiber manufacturer to control product quality.

At present, a method for testing torsional performance of the metallic OPGW single wire is to twist the OPGW single wire in the same direction, and stop testing when it is broken. Its torsional performance is determined through the number of twisting circles when the single wire is broken. This test method is valid for a new OPGW product. However, a practical operation environment of the OPGW single wire is relatively more complex, for example, wind vibration, icing, corrosion and the like, so that, for the torsional performance of the OPGW single wire which works for years or is affected by a disaster, it is difficult to accurately test its practical performance by using the above test method.

SUMMARY

In view of this, the disclosure discloses an OPGW single wire torsional fatigue test method, so as to solve the problem of relatively greater difference between a performance test result, obtained by an existing test method, of the OPGW single wire and a stress state of the OPGW single wire during practical use. The disclosure further discloses an OPGW single wire torsional fatigue test apparatus and storage medium.

On an aspect, the disclosure discloses an OPGW single wire torsional fatigue test method, which includes: a preset torsional angle and a preset cycle number of torsions of the OPGW single wire are acquired; forward and backward torsional forces are sequentially and alternately applied to the OPGW single wire according to the preset torsional angle; and when a cycle number of the applied torsional forces reaches a preset value, torsional force application to the OPGW single wire is stopped.

Furthermore, the OPGW single wire torsional fatigue test method may further include that: an axial tensile force is applied to the OPGW single wire.

Furthermore, in the OPGW single wire torsional fatigue test method, a value range of the preset torsional angle may be 0~1,080°.

In the disclosure, according to the OPGW single wire torsional fatigue test method, a bidirectional torsional fatigue test on the OPGW single wire may be made by sequentially and alternately applying the forward and backward torsional forces to the OPGW single wire according to the preset torsional angle, so that reliability of a test result and test efficiency are improved.

On another aspect, the disclosure further discloses an OPGW single wire torsional fatigue test apparatus, which includes: a control device, a torsional force loading device, a first clamping mechanism, a second clamping mechanism and a bearing device, wherein the first clamping mechanism is connected with a loading end of the torsional force loading device, the second clamping mechanism is connected with the bearing device, and two ends of a to-be-tested OPGW single wire are connected with the first clamping mechanism and the second clamping mechanism respectively; and the control device is connected with the torsional force loading device, and is configured to control the loading end of the torsional force loading device to rotate sequentially and alternately forwards and backwards according to a preset torsional angle and a preset cycle number of torsions.

Furthermore, in the OPGW single wire torsional fatigue test apparatus, the torsional force loading device may include: a power application device and a speed reducer, wherein the control device may be connected with the power application device, an output end of the power application device may be connected with the speed reducer, and the first clamping mechanism may be connected with an output end of the speed reducer.

Furthermore, the OPGW single wire torsional fatigue test apparatus may further include: an axial force loading device, wherein the axial force loading device may be connected with the bearing device, and may be configured to apply an axial force to the OPGW single wire.

Furthermore, in the OPGW single wire torsional fatigue test apparatus, the bearing device may include: a sliding mechanism and cushioning mechanism which are sequentially arranged, wherein the second clamping mechanism may be connected with the sliding mechanism, a damping piece may be arranged on a wall surface which faces the sliding mechanism of the cushioning mechanism, and the damping piece may be configured to absorb an impact force applied to the cushioning mechanism by the sliding mechanism when the OPGW single wire is broken.

Furthermore, the OPGW single wire torsional fatigue test apparatus may further include: an angle sensor, wherein the angle sensor may be connected to the first clamping mechanism, and may be configured to detect a torsional angle of the first clamping mechanism; and the control device may be connected with the angle sensor, and may be configured to receive the torsional angle, and when the torsional angle reaches the preset torsional angle, to control the torsional force application device to rotate towards an opposite direction.

Furthermore, in the OPGW single wire torsional fatigue test apparatus, the axial force loading device may include: a steel wire rope, a pulley and a loading mechanism, wherein the steel wire rope may be wound on the pulley, one end of the steel wire rope may be connected with the bearing device, and the other end of the steel wire rope may be connected with the loading mechanism.

Furthermore, in the OPGW single wire torsional fatigue test apparatus, the axial force loading device may be an electric screw rod.

In the disclosure, the torsional force loading device is controlled by the control device to make a bidirectional torsional fatigue test on the OPGW single wire, and meanwhile, a unidirectional torsion test and a tensile test may further be made on it; and the device is easy to operate and diversified in function.

BRIEF DESCRIPTION OF DRAWINGS

Various other advantages and benefits get clear to those skilled in the art after detailed descriptions about the following preferred implementation modes are read. The drawings are only adopted to show preferred implementation modes and not restrictive of the disclosure. Moreover, in the whole drawings, the same parts are represented with the same numbers. In the drawings.

DETAILED DESCRIPTION

Figure 1:
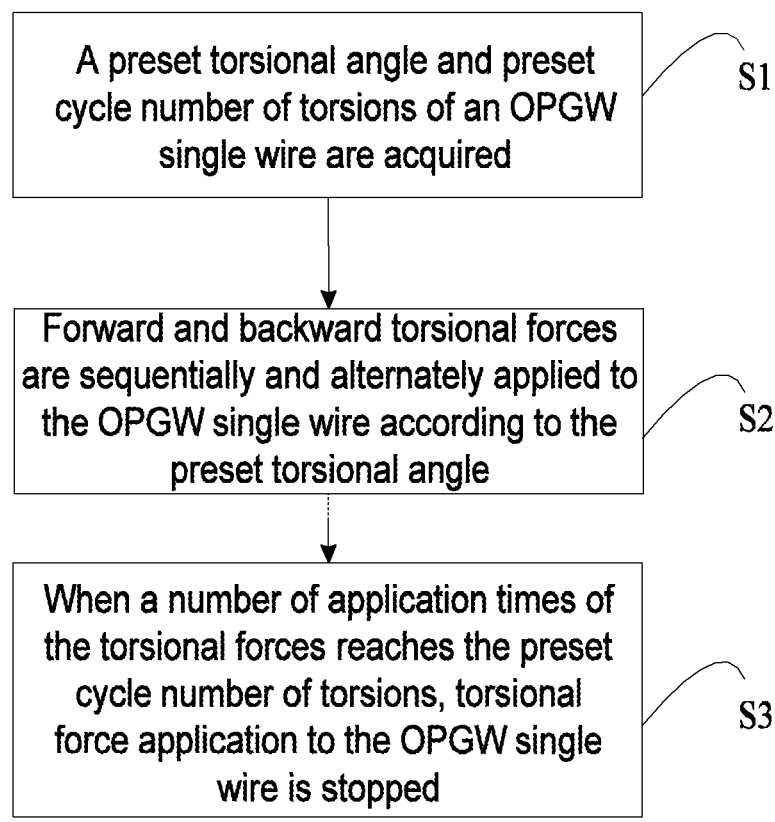
FIG. 1 is a flow chart of an OPGW single wire torsional fatigue test method according to an embodiment of the disclosure.

Exemplary embodiments of the disclosure will be described below with reference to the drawings in detail. Although exemplary embodiments of the disclosure are shown in the drawings, it should be understood that the disclosure may be implemented in various forms and should not be limited by the embodiments elaborated herein. Instead, these embodiments are provided to make the disclosure understood more thoroughly and completely deliver the scope of the disclosure to those skilled in the art. It is important to note that embodiments in the disclosure and characteristics in the embodiments may be combined without conflicts. The disclosure will be described below with reference to the drawings and in combination with the embodiments in detail.

Test Method Embodiment

Referring to FIG. 1, FIG. 1 is a flow chart of an OPGW single wire torsional fatigue test method according to an embodiment of the disclosure. As shown in this figure, the method includes the following steps.

In step S1, a preset torsional angle and a preset cycle number of torsions of an OPGW single wire 1 are acquired.

Specifically, the torsional angle and the cycle number of torsions of the OPGW single wire 1 may be preset, and the preset torsional angle of the OPGW single wire 1 may be any angle of 1~1,080°. Preferably, a numerical value of the torsional angle of the OPGW single wire 1 may be set to be 360°, 720° or 1,080°, that is to say, the OPGW single wire 1 is twisted for 1 circle, two circles or three circles. In addition, the cycle number of torsions is further set for the OPGW single wire 1, and the cycle number of torsions is determined according to a practical condition of the OPGW single wire 1. It is important to note that the cycle number is at least twice.

In step S2, forward and backward torsional forces are sequentially and alternately applied to the OPGW single wire 1 according to the preset torsional angle.

Specifically, a forward torsional force may be applied to the OPGW single wire 1 at first to twist the OPGW single wire 1 to a preset angle, and then a backward torsional force whose value is equivalent to the forward torsional force is applied to the OPGW single wire 1 to twist the OPGW single wire 1 in an opposite direction to a preset angle, that is, numerical values of a forward torsional angle and a backward torsional angle of the OPGW single wire 1 are equal. It is important to note that, during specific implementation, a forward twist or a backward twist means completion of a twist.

During testing, the OPGW single wire 1 may be twisted 360° forwards and then twisted 360° backwards, and those operations cycle like this for a preset cycle number of torsions. The OPGW single wire 1 may also be twisted 720° forwards and then twisted 720° backwards, and those operations cycle like this for the preset cycle number of torsions. The OPGW single wire 1 may further be twisted 1,080° forwards and then twisted 1,080° backwards, and those operations cycle like this for the preset cycle number of torsions.

In step S3, when the number of application times of the torsional forces reaches a preset value, torsional force application to the OPGW single wire is stopped.

When the cycle number of the applied torsional forces reaches the preset value, torsional force application to the OPGW single wire 1 is stopped. At this moment, another performance test may be applied to the twisted/torsional OPGW single wire. It is important to note that the preset value refers to a preset cycle number.

According to the OPGW single wire torsional fatigue test method in this embodiment, a bidirectional torsional fatigue test may be made on the OPGW single wire by sequentially and alternately applying the forward and backward torsional forces to the OPGW single wire according to the preset torsional angle, so that a stress condition of the OPGW single wire during testing in the test method is closer to a stress state in a practical application scenario, reliability of a test result is greatly improved, and the problem of relatively lower reliability of an existing torsion resistance test result of the OPGW single wire is solved.

Figure 2:
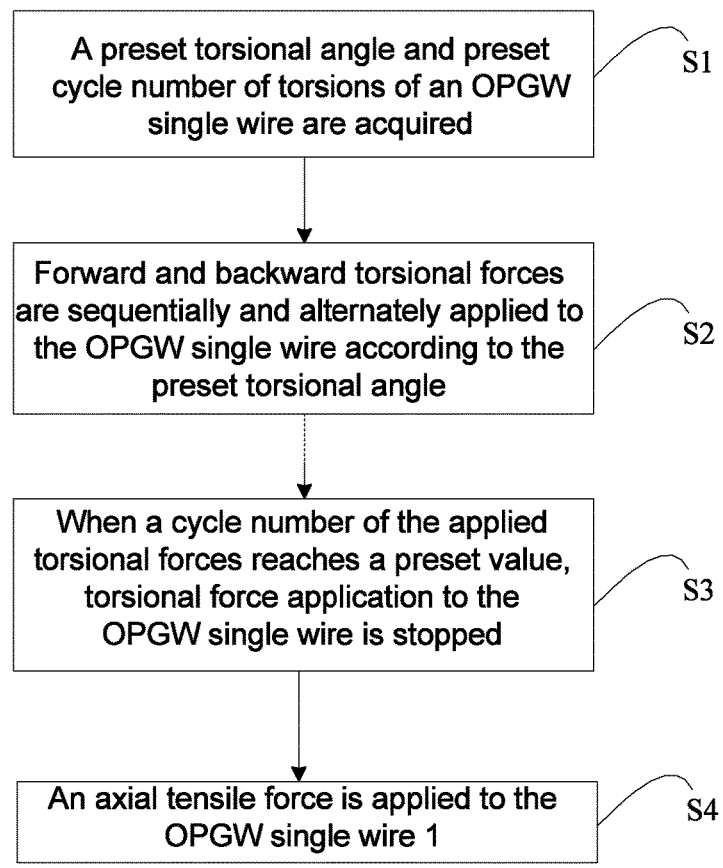
FIG. 2 is another flow chart of an OPGW single wire torsional fatigue test method according to an embodiment of the disclosure.
Figure 3:
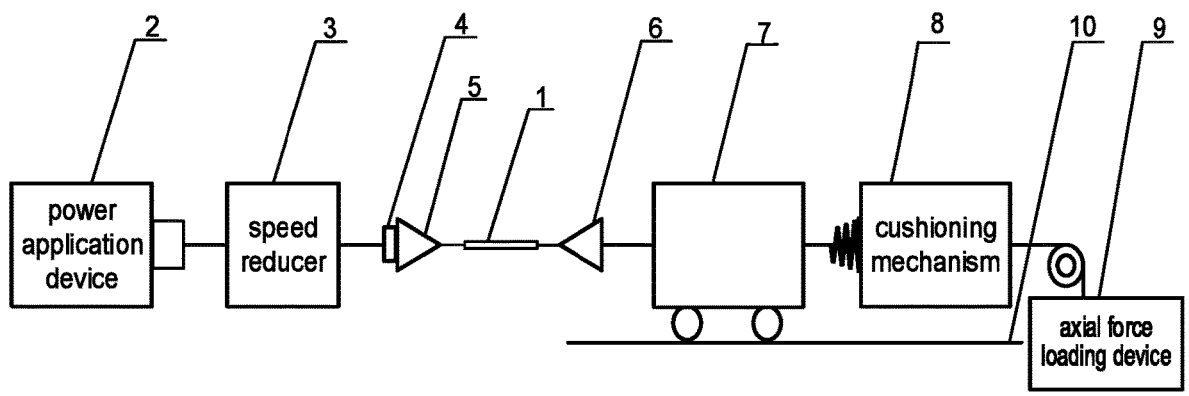
FIG. 3 is a structure diagram of an OPGW single wire torsional fatigue test apparatus according to an embodiment of the disclosure.

Referring to FIG. 2, in this embodiment, the method may further include the following step: in step S4, an axial tensile force is applied to the OPGW single wire 1 to make the torsional fatigue test on the OPGW single wire 1 under dual actions of the torsional forces and the tensile force.

It is important to note that step 3 and step 4 may be executed at the same time, and there is no sequence during implementation.

Test Apparatus Embodiment

FIG. 2 shows a preferred structure of an OPGW single wire torsional fatigue test apparatus according to an embodiment of the disclosure. As shown in this figure, the test apparatus includes: a control device (not shown in the figure), a torsional force loading device, a first clamping mechanism 5, a second clamping mechanism 6 and a bearing device (not shown in the figure).

Wherein, the torsional force loading device is provided with a loading end, and the loading end may be rotated sequentially and alternately forwards and backwards. During specific implementation, the torsional force loading device may be a mechanism with a rotating function such as a motor. The first clamping mechanism 5 is connected with the loading end of the torsional force loading device, the first clamping mechanism 5 is configured to be connected with one end of the OPGW single wire, and the torsional force loading device may drive the first clamping mechanism 5 to rotate to further apply torsional forces to the OPGW single wire. The second clamping mechanism 6 is connected with the bearing device, and the second clamping mechanism 6 is configured to clamp the other end of the OPGW single wire. The bearing device may apply a certain tension to make the OPGW single wire clamped between the first clamping mechanism 5 and the second clamping mechanism 6 in a straight state.

It is important to note that, during specific implementation, the first clamping mechanism 5 and the second clamping mechanism 6 may be chucks, and may also be other clamping apparatus with a clamping function known by those skilled in the art. Its specific structure will not be limited in this embodiment as long as clamping of the OPGW single wire.

The torsional force loading device is connected with the control device, a preset torsional angle and a preset cycle number of torsions are preset in the control device. The control device controls a loading end of the torsional force loading device to rotate sequentially and alternately in forward and backward manners according to the preset torsional angle and a preset cycle number of torsions.

During testing, the control device sends a loading signal to the torsional force loading device. The torsional force loading device receives the loading signal, performs twisting in a first direction according to the loading signal, and transmits a torsional force in the first direction to the first clamping mechanism 5. The OPGW single wire 1 is twisted towards the first direction by the torsional force in the first direction; when it is twisted to a preset angle, the control device sends a loading signal of twisting towards a second direction to the torsional force loading device so as to further twist the OPGW single wire 1 to a preset angle towards the second direction. Twisting cycles like this. When the preset cycle number is reached, a control system sends a stopping signal, the torsional force loading device stops twisting, and testing is ended. Of course, the torsional force loading device may further make a unidirectional torsion test on the OPGW single wire 1 only under control of the control device, and stops testing when the OPGW single wire 1 is broken. After the bidirectional torsion test is ended, a tensile strength test on the OPGW single wire may be made to accurately and reliably evaluate performance of the OPGW single wire.

It is important to note that the first direction and second direction in this embodiment are two opposite directions.

It can be seen that, in this embodiment, the forward and backward torsional forces are alternately applied to the OPGW single wire through the torsional force loading device, so that a stress state of the OPGW single wire during testing is closer to a stress state in a practical working process, parameter performance of the OPGW single wire may be better tested, and the problem of incapability of an existing test apparatus in reliably and accurately evaluating the performance of the OPGW single wire is solved. In addition, the test apparatus may further make a unidirectional torsional fracture test on the OPGW single wire to obtain performance of the OPGW single wire from each aspect.

Referring to FIG. 2, in this embodiment, the torsional force loading device may include: a power application device 2 and a speed reducer 3, wherein the power application device 2 may be a servo motor or another motor, which will not be limited in the embodiment. The speed reducer 3 may be a cycloidal pin gear speed reducer or a speed reducer of another type, and the type of the speed reducer may be selected according to a practical condition during specific implementation.

The control device is connected with the power application device 2, an output end of the power application device 2 is connected with the speed reducer 3, and the first clamping mechanism 5 is connected with an output end of the speed reducer 3. The speed reducer 3 reduces a speed of the power application device 2 to enable the power application device 2 apply an axial torsional force to the first clamping mechanism 5 after reaching a preset rotating speed in testing.

In this embodiment, the test apparatus further includes: an axial force loading device 9, wherein the axial force loading device 9 is connected with the bearing device, and is configured to apply an axial force to the OPGW single wire 1. Specifically, the bearing device may be arranged on a bearing platform. The axial force loading device 9 may include: a steel wire rope, a pulley and a loading mechanism. A bracket may be mounted on the bearing platform, the pulley is mounted on the bracket, and the steel wire rope is wound on the pulley. Moreover, one end of the steel wire rope is connected with a sliding mechanism 7, and the other end of the steel wire rope is connected with the loading mechanism, so as to apply the axial force to the OPGW single wire 1. In addition, the axial force loading device 9 may further be an electric screw rod, and the loaded axial force may be automatically regulated for single wires 1 of OPGWs in different specifications through the electric screw rod, so that test efficiency is improved. It is important to note that the axial force loading device 9 may further apply a tensile force to the OPGW single wire 1 when tensile resistance of the OPGW single wire 1 is measured.

Referring to FIG. 2, in the embodiment, the bearing device may include: the sliding mechanism 7 and a cushioning mechanism 8 which are sequentially arranged. During testing, the sliding mechanism 7 and the cushioning mechanism 8 may both be arranged on the bearing platform (not shown in the figure), the sliding mechanism 7 may be a sliding block, and the cushioning mechanism 8 may be a square mechanism with a certain weight. The second clamping mechanism 6 is connected with the sliding mechanism 7, a damping piece is arranged on a wall surface which faces the sliding mechanism 7 of the cushioning mechanism 8, and the damping piece may be a spring. During specific implementation, a guide rail 10 may be arranged on the bearing platform, the sliding mechanism 7 is arranged on the guide rail 10, and the sliding mechanism 7 may pull the OPGW single wire 1 to slide along an axial direction of the OPGW single wire through the guide rail 10.

During testing, if the OPGW single wire 1 is broken, the sliding mechanism 7 may slide to the cushioning mechanism 8 along the guide rail 10 and impact the damping piece of the cushioning mechanism 8, so as to apply an acting force to the cushioning mechanism 8 due to inertia. At this moment, the damping piece in the cushioning mechanism 8 may effectively absorb the acting force to reduce an impact force on the cushioning mechanism 8.

In the embodiment, the test apparatus may further include: an angle sensor 4, wherein the angle sensor is connected with the first clamping mechanism 5, and is configured to detect a torsional angle of the first clamping mechanism 5. The control device is connected with the angle sensor 4, and is configured to receive the torsional angle and control the torsional force application device to rotate towards an opposite direction when the torsional angle reaches the preset torsional angle. During specific implementation, the angle sensor 4 feeds back the detected torsional angle of the OPGW single wire 1 to the control device, and the control device judges whether the preset torsional angle is reached according to the detected torsional angle. If the preset angle is reached, the control device sends a control command to cause the torsional force loading device to apply a torsional force in the opposite direction to the first clamping mechanism 5.

From the above, in the embodiment, the torsional force loading device is controlled by the control device to make a bidirectional torsional fatigue test on the OPGW single wire, and reliability of a test result and test efficiency are improved.

Obviously, those skilled in the art may make various modifications and transformations to the disclosure without departing from the spirit and scope of the disclosure. Therefore, if these modifications and transformations of the disclosure fall within the scopes of the claims in the disclosure and an equivalent technology thereof, the disclosure is also intended to include these modifications and transformations.

The invention claimed is:

1. An optical fiber composite overhead ground wire (OPGW) single wire torsional test method, comprising:
   acquiring a preset torsional angle and a preset cycle number of torsions of an OPGW single wire;
   sequentially and alternately applying forward and backward torsional forces to the OPGW single wire according to the preset torsional angle; and
   stopping torsional force application to the OPGW single wire when a number of application times of the torsional forces reaches the preset cycle number of torsions;
   wherein the sequentially and alternately applying forward and backward torsional forces to the OPGW single wire according to the preset torsional angle comprises:
   applying the forward torsional force to the OPGW single wire, and twisting the OPGW single wire to the preset torsional angle to complete a forward twist; and
   applying the backward torsional force whose value is equivalent to that of the forward torsional force to the OPGW single wire, and twisting the OPGW single wire in an opposite direction to the preset torsional angle to complete a backward twist.

2. The OPGW single wire torsional test method according to claim 1, further comprising: applying an axial tensile force to the OPGW single wire.

3. The OPGW single wire torsional test method according to claim 1, wherein a value range of the preset torsional angle is 0~1,080°.

4. An optical fiber composite overhead ground wire (OPGW) single wire torsional test apparatus, comprising: a control device, a torsional force loading device, a first clamping mechanism, a second clamping mechanism and a bearing device, wherein the first clamping mechanism is connected with a loading end of the torsional force loading device; the second clamping mechanism is connected with the bearing device, and two ends of a to-be-tested OPGW single wire are connected with the first clamping mechanism and the second clamping mechanism respectively; and the control device is connected with the torsional force loading device, and is configured to acquire a preset torsional angle and a preset cycle number of torsions of the OPGW single wire, to sequentially and alternately apply forward and backward torsional forces to the OPGW single wire according to the preset torsional angle, and to stop torsional force application to the OPGW single wire when a number of application times of the torsional forces reaches the preset cycle number of torsions;

wherein the control device is further configured to:

apply the forward torsional force to the OPGW single wire, and twist the OPGW single wire to the preset torsional angle to complete a forward twist; and apply the backward torsional force whose value is equivalent to that of the forward torsional force to the OPGW single wire, and twist the OPGW single wire in an opposite direction to the preset torsional angle to complete a backward twist.

5. The OPGW single wire torsional test apparatus according to claim 4, wherein the torsional force loading device comprises: a power application device and a speed reducer, wherein
   the control device is connected with the power application device, an output end of the power application device is connected with the speed reducer, and the first clamping mechanism is connected with an output end of the speed reducer.

6. The OPGW single wire torsional test apparatus according to claim 4, further comprising: an axial force loading device, wherein the axial force loading device is connected with the bearing device, and is configured to apply an axial force to the OPGW single wire.

7. The OPGW single wire torsional test apparatus according to claim 6, wherein the bearing device comprises: a sliding mechanism and a cushioning mechanism, wherein
   the second clamping mechanism is connected with the sliding mechanism, a damping piece is arranged on a wall surface which faces the sliding mechanism of the cushioning mechanism, and the damping piece is configured to absorb an impact force applied to the cushioning mechanism by the sliding mechanism when the OPGW single wire is broken.

8. The OPGW single wire torsional test apparatus according to claim 4, further comprising: an angle sensor, wherein
   the angle sensor is connected with the first clamping mechanism, and is configured to detect a torsional angle of the first clamping mechanism; and
   the control device is connected with the angle sensor, and is configured to receive the torsional angle, and to control a torsional force application device to rotate towards an opposite direction when the torsional angle reaches the preset torsional angle.

9. The OPGW single wire torsional test apparatus according to claim 6, wherein the axial force loading device comprises: a steel wire rope, a pulley and a loading mechanism, wherein
   the steel wire rope is wound on the pulley, one end of the steel wire rope is connected with the bearing device, and other end of the steel wire rope is connected with the loading mechanism.

10. The OPGW single wire torsional test apparatus according to claim 6, wherein the axial force loading device is an electric screw rod.

11. A non-transitory storage medium, comprising a set of instructions being executed by a processor to implement an optical fiber composite overhead ground wire (OPGW) single wire torsional test method, comprising:

acquiring a preset torsional angle and a preset cycle number of torsions of an OPGW single wire;

sequentially and alternately applying forward and backward torsional forces to the OPGW single wire according to the preset torsional angle; and stopping torsional force application to the OPGW single wire when a number of application times of the torsional forces reaches the preset cycle number of torsions;

wherein the sequentially and alternately applying forward and backward torsional forces to the OPGW single wire according to the preset torsional angle comprises:

applying the forward torsional force to the OPGW single wire, and twisting the OPGW single wire to the preset torsional angle to complete a forward twist; and applying the backward torsional force whose value is equivalent to that of the forward torsional force to the OPGW single wire, and twisting the OPGW single wire in an opposite direction to the preset torsional angle to complete a backward twist.

12. The non-transitory storage medium according to claim 11, further comprising: applying an axial tensile force to the OPGW single wire.

13. The non-transitory storage medium according to claim 11, wherein a value range of the preset torsional angle is 0~1080°.

* * * * *